Aug. 18, 1970    K. STÖCKEL    3,524,319
ROCKET ENGINE WITH COOLING WALLS OF COMBUSTION
CHAMBER WITH OXYGEN-SUPPLYING LIQUID
Filed May 3, 1955    2 Sheets-Sheet 1

INVENTOR:
KARL STÖCKEL.

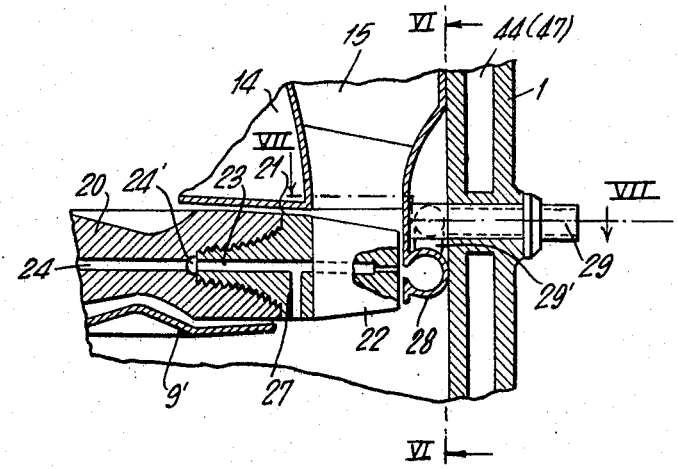
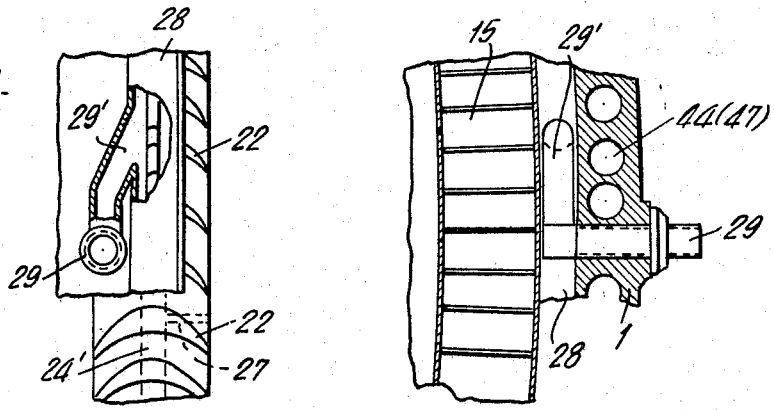

United States Patent Office 3,524,319
Patented Aug. 18, 1970

3,524,319
ROCKET ENGINE WITH COOLING WALLS OF COMBUSTION CHAMBER WITH OXYGEN-SUPPLYING LIQUID
Karl Stöckel, Berlin-Friedenau, Germany, assignor to Bolkow Gesellschaft mit beschrankter Haftung
Filed May 3, 1955, Ser. No. 505,724
Int. Cl. F02k 9/02
U.S. Cl. 60—259                    13 Claims This invention relates to jet and rocket engines and the like driving means employing the reaction force of a stream or jet of combustion gases.

It is an object of the present invention to provide means conducive to a novel and greatly improved jet or rocket engine in which an oxygen-supplying liquid, prior to its injection into the combustion chamber of the engine, is circulated through ducts in the walls of the engine casing and exhaust nozzle to serve as a cooling medium therefor.

It is another object of the present invention to provide means affording a substantially simplified, yet operationally efficacious jet engine in which the oxygen-supplying liquid is fed to the combustion chamber under a pressure in excess of the critical pressure of oxygen and in a quantity in excess of that required to ensure complete combustion of the fuel injected into the combustion chamber of the engine.

It is still another object of the present invention to provide means contributing to high-efficiency jet engines enabling a substantial reduction in the ratio of the weight of fuel material fed into the combustion chamber to the driving power generated by said engines to be attained, whereby engine efficiency is substantially enhanced.

Yet another object of the present invention is to provide means facilitating economic and relatively inexpensive operation of a jet or rocket engine with a great degree of safety by provision of spaced combustion chambers in one and the same casing wherein the means for supplying fuel to one of said chambers simultaneously effectuates actuation of the means for supplying oxygen to the other chamber, thus eliminating the need for separate driving means for both said supplying means.

More particularly, the invention contemplates employing an oxygen-supplying liquid, which may be liquid oxygen or any other suitable oxygen-releasing liquid, for the purpose of supporting combustion of the fuel. In accordance with the invention, an engine housing or casing in which there is formed at least one combustion chamber is provided, a plurality of cooling ducts being incorporated in the walls of this casing so as to extend essentially parallel to the axis of the engine.

The ducts are so arranged that the liquid flows, in a substantially straight-line path, in some of them in one direction and in the others in the opposite direction before it enters the combustion chamber. A centrifugal pump for the oxygen-supplying liquid is provided which feeds the latter into said ducts in said one direction under a pressure above the critical pressure of oxygen.

As a further refinement of the invention, a gas turbine is disposed internally of the engine housing or casing in the stream of the combustion gases to serve both as a driving means for the oxygen-feeding centrifugal pump and simultaneously as a centrifugal pump for the fuel. The turbine is so arranged in the engine housing that the internal space thereof is divided into a preliminary combustion chamber and a final combustion chamber. Such an arrangement is also advantageous in engines which do not present all the above-mentioned characteristics and in which the oxygen is not fed into one of the combustion chambers under supercritical conditions.

The feeding of the oxygen or the oxygen-supplying medium into the preliminary combustion chamber in excess of the amount actually required for complete combustion of the fuel oil fed into said chamber enhances the combustion process and decreases the danger of explosions under conditions of changing driving force or power output to a greater extent than heretofore employed methods of injecting liquid oxygen or oxygen-releasing liquids into the combustion chamber. As a consequence, an engine according to the invention working with oxygen under supercritical conditions may be better regulated than engines presently in vogue.

Moreover, the feeding of the oxygen under supercritical conditions precludes vaporization of the oxygen-supplying liquid while it is acting as the cooling medium. Such vaporization could result in an interruption of cooling action which would be especially dangerous for the nozzle.

The mounting of the gas turbine, which serves as the driving mechanism for both the fuel oil and oxygen-feeding systems, in the engine casing is especially advantageous when the engine is associated with individual supplying and feeding arrangements for the fuel oil and the oxygen-supplying medium located externally of the casing because it results in a simplified engine construction and consequent increased safety in operation. The amount of material required for the engine operation is substantially reduced, and no special driving means or materials have to be employed to actuate the turbine.

Inasmuch as the feeding of the fuel oil and oxygen in accordance with the invention may be accomplished to a better degree and without the additional difficulties inherent in known constructions employing feeding means disposed externally of the engine, the elements serving to cool the engine may be more efficaciously constructed while a greater pressure drop in the cooling channels may be permitted.

As will be readily understood, an engine according to the present invention may be used on aircraft, land vehicles, and ships, the construction in any eventuality being modified only to the extent required by the desired operating conditions of the vehicle involved and by such factors as permissible load, streamlining, aerodynamic resistance, and the like.

The invention will be more fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

FIG. 5 is an enlarged sectional view of a detail of the fuel feeding means shown in FIG. 1;

FIG. 6 is a sectional view taken along the line VI—VI in FIG. 5; and

FIG. 7 is a partly sectional side view of the structure shown in FIG. 6 as taken along the line VII—VII in FIG. 5.

Figure 2:
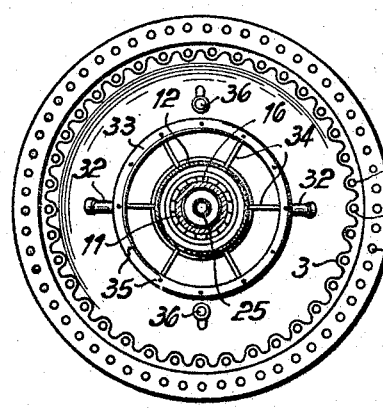
FIG. 2 is a sectional view taken along line II—II in FIG. 1.
Figure 3:
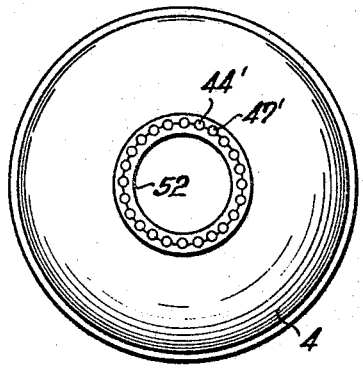
FIG. 3 is a sectional view taken along line III—III in FIG. 1.

Referring more particularly to the drawing, the engine body consists of an elongated housing or casing 1, a dome-shaped head 2 forming an extended portion of said casing and having an inner wall or shell 3, and an exhaust nozzle 4 having a throat 50 of reduced cross-section and an exhaust opening 51. Head 2 and nozzle 4 are fixedly attached to housing 1 by means of rivets or screw bolts 5 and 6, respectively. Bolts 5' provided adjacent the head end of the housing permit mounting of the entire engine on a suitable supporting structure, such as a ring (not shown).

The space enclosed by housing 1 is divided into two combustion chambers, a preliminary combustion chamber 7 and a final combustion chamber 8. These two chambers are separated by means of rotating wheel 20 and housing 15 of a gas turbine 9. The turbine wheel, which is, in substance, a plate of a suitably strong, light metal, such as Duralumin, is provided with an axle journal 10 to which is connected a hollow shaft 11. The side of this plate facing toward chamber 8 is covered or shielded by a plate 9' composed of a high-temperature resistant material such as steel or the like. Axle journal 10 is provided with a central bore 10' for a purpose to be more fully explained hereinbelow.

A tubular bearing housing 12 has one of its ends retained in a tubular socket 13 disposed in inner head shell 3 and its other end fixed to a plurality of ribs 14 provided on turbine housing 15. The axle journal 10 on which hollow shaft 11 is fitted is disposed in bearing housing 12 has one of its ends engaged in a ball bearing 17, while the shaft 11 has an end disposed in socket 13 engaged in a ball bearing 16. Of course, the ball bearings could be replaced by other types of bearings, such as roller bearings, sliding or sleeve bearings, and the like.

Disposed between bearing tube or housing 12 and hollow shaft 11 is a sleeve bearing 18 which serves to center shaft 11 in housing 12 as well as to substantially seal the upper end of housing 12 from the gases flowing in the combustion chamber. A portion of housing 12 below the bearing 18 is provided with a plurality of slits or like perforations 19.

Perforations 19 provide an entrance into housing 12 for oxygen gases heated in chamber 7. Said gases, thus, flow around and cool hollow shaft 11 and ball bearing 17 and then flow through openings 9" in turbine wheel 20 into the space between said wheel and shield plate 9' to cool the latter. Thereafter, these oxygen gases escape past the periphery of plate 9' into chamber 8.

Fixed to plate 20 by any suitable means such as a bolt is a steel vane ring 21 on which are provided a plurality of steel vanes 22. Vanes 22 are perforated by bores 23 which communicate with radial bores 24 in turbine plate 28. Bores 24 extend from a central channel or passageway 25 formed by a bore in journal 10 and a tube 25' disposed in hollow shaft 11 and terminate in an annular distributing groove 24' (see FIG. 5) located in the outer periphery of the plate 20. Each of the bores 23 also communicates with the groove 24'. This tube is supported in shaft 11 coaxially therewith by means of spacer rings or spiders 26.

Figure 1:
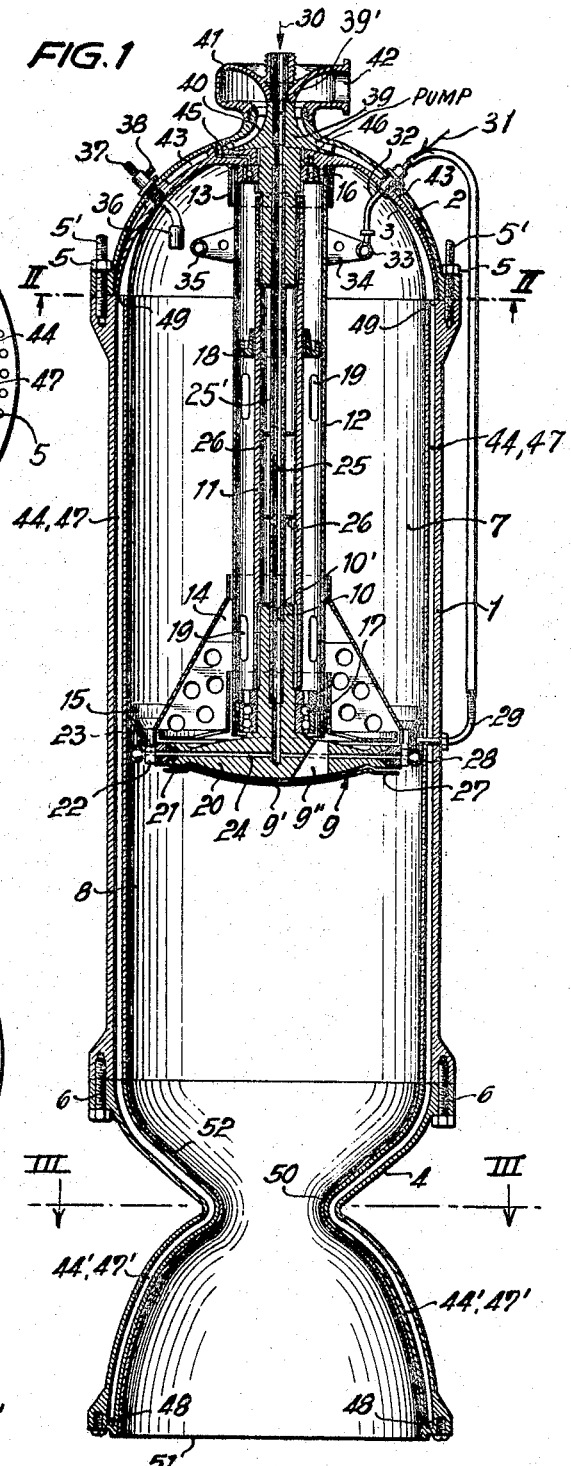
FIG. 1 is a longitudinal sectional view of a jet engine embodying the present invention.

Adjacent the circumference of turbine wheel plate 20 there are provided a plurality of passageways 27 (see FIGS. 1 and 5) each communicating at one end with a respective one of the radial channels 24 and at the other end with chamber 8. Vane bores 23 are arranged opposite a tubular ring-shaped portion 28 of turbine housing 15, said ring being provided with an opening facing the open ends of bores 23. Communicating with the interior of ring-shaped portion 28 through angled branch channels 29' (see FIGS. 5, 6 and 7) are conduits 29, only one of which is shown in FIG. 1.

Connected to the end of hollow shaft 11 disposed in head 2 is a rotor 39 of a centrifugal pump, said rotor being provided with vanes 40 and with a central bore 39, communicating with passageway 25. To head 2 is fixed housing 41 of the centrifugal pump having an inlet opening 42, and an oxygen-suppling liquid, preferably liquid oxygen, is fed from a supply tank therefor into housing 41 through said opening 42. Between head 2 and inner shell 3 there is formed a vane space 43 which provides the usual guide channels through which the liquid oxygen may be forced by rotatably mounted centrifugal pump 39, 40, which can be best seen in FIG. 1.

A suitable fuel, such as oil, is fed into bore 39' and channel 25 in the direction of arrow 30 (see FIG. 1) to be centrifuged outwardly of the turbine wheel through channels 24 and partially injected into chamber 8 through transverse passageways 27. A part of the fuel passes through bores 23 and ring portion 28 and via the channels 29' into conduits 29. The latter are connected, in any suitable manner, to inlet conduits 32 disposed in head 2, the fuel flowing in the direction of arrow 31.

A hollow ring 33 is supported from bearing housing 12 by means of ribs or supporting brackets 34, the interior of ring 33 being in communication with conduits 32. The oil is sprayed or discharged into chamber 7 from ring 33 through suitable openings, such as nozzles 35, provided in the ring. Disposed adjacent ring 33 is an ignition or starting burner 36. An inlet opening 37 in burner or torch 36 provides access to preliminary combustion chamber 7 for fuel oil and another inlet opening 38 of burner 36 provides access for air or oxygen.

The wall of casing 1 is provided with a plurality of longitudinally extending, parallel channels or ducts 44 which communicate with a corresponding number of channels 44' in the wall of nozzle 4. Provided adjacent the exhaust end or discharge opening 51 of nozzle 4 is a circular channel or duct 48 which communicates with all of said channels 44'. Also communicating with channel 48 is a plurality of channels or ducts 47' in the wall of nozzle 4 extending substantially parallel to ducts 44' and communicating with a like number of channels or ducts 47 disposed in the wall of casing 1 and extending parallel to channels 44. Channels 47 terminate in openings 49 in preliminary combustion chamber 7.

In effect, therefore, the engine body consists of a substantially tubular inner portion, i.e., the inner walls of casing 1 and nozzle 4, surrounded by a similarly shaped outer jacket, i.e., the outer walls of casing 1 and nozzle 4, enabling a cooling medium to be introduced into the space between said inner portion and said jacket.

The liquid oxygen or oxygen-supplying liquid is forced by the compression means constituted by pump 39, 40 from vane space 43 through channels 44 longitudinally of casing or housing 1 into channels 44' and back through channels 47' and 47 into chamber 7 through openings 49. The liquid is vaporized in the channels and enters housing 12 from chamber 7 through perforations 19. The substantial lengths of the cooling paths consisting of ducts 44, 44' and 47', 47 ensure complete vaporization of the liquid oxygen as well as a maximum withdrawal of heat from the casing and nozzle walls.

Some of the heated gases leak past sliding bearing 18 and flow around ball bearing 16 to maintain the latter at a normal temperature relative to the cool surroundings. Thereafter, the gases escape through bores or channels 45 in the walls of the guide conduits of vane space 43.

The operation of the engine according to the invention is as follows:

It is assumed that the engine is driven by liquid oxygen and fuel oil which are retained in any suitable manner in their respective supply tanks under predetermined pressures. By way of example, the liquid oxygen may be under a pressure of 2 atmospheres and the fuel oil under a pressure of 3 atmospheres.

When ignition burner 36 is actuated there is created in preliminary combustion chamber 7 a mass of combustion gases under superatmospheric pressure. These gases flow over and past the vanes of the flow responsive turbine wheel into final combustion chamber 8, thus setting the turbine wheel into rotation and thereby actuating centrifugal pump 39, 40 for the liquid oxygen. The oxygen which is forced into channels 44 thus serves as a cooling medium.

As the temperature of the engine casing and nozzle rises, the liquid oxygen is vaporized so that, since the centrifugal pump feeds it under a supercritical pressure of approximately 65 atmospheres, it escapes at ends 49 of channels 47 in a gaseous state under supercritical conditions.

At the same time, the turbine wheel with its radial channels 24 functions as a centrifugal pump for the fuel oil flowing in passageway 25, the oil being subsequently injected into chamber 7 from ring 33 in quantities depending directly on the rotary speed of the turbine wheel. The arrangement is such that at conditions of equilibrium, i.e., constant operation and combustion, there is a great excess of oxygen in chamber 7 over and above the amount required to ensure complete combustion of all of the oil. As a result, the burning of the oil injected into combustion chamber 7 serves to heat the excess oxygen.

The mixture of heated excess oxygen and combustion gases provide, during their passage through the turbine, the required work or energy for feeding of the fuel oil and the oxygen. The oxygen content of this preheated mixture serves, after entrance thereof into chamber 8, to ensure complete combustion of any fuel oil centrifuged into chamber 8 from turbine wheel 20 through channels 27. The exhaust gases escape, in well known manner, from the nozzle past throat 50 at great speeds, thus effectively pushing the vehicle or aircraft on which the engine is mounted in the opposite direction.

The fuel oil, during its passage to chamber 8, additionally effects cooling of hollow shaft 11 and the turbine wheel, the oil thus being simultaneously preheated to facilitate rapid and complete combustion thereof in chamber 8.

Figure 4:
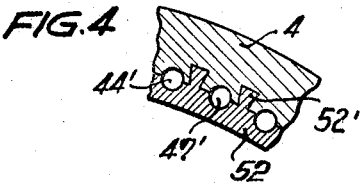
FIG. 4 shows a modified detail of the invention on an enlarged scale.

The combustion temperatures in the preliminary combustion chamber normally range between 400° C. and 800° C., while the temperatures in the final combustion chamber may rise up to 3600° C. It is, therefore, advisable to line the inner surface of the nozzle with a coating or shield 52 of beryllium-copper which is fixedly attached to nozzle 4, as by tongue-and-groove joints 52', in order to prevent application of undue stresses and strains to the shield (see FIG. 4).

Channels 44, 44' and 47, 47' are preferably roughened on their inner surfaces in order to ensure good thermal transfer between the cooling medium, i.e., the liquid oxygen, and the metal of which the channel walls are formed. The arrangement of the turbine in the working stream of the engine and the direct drive of the centrifugal pump by the turbine wheel which is coaxially arranged with the centrifugal pump enables sufficient energy to be generated to drive the cooling medium through the cooling ducts at a high speed.

On the surfaces of the casing and nozzle walls there may be provided one or more cooling ribs or fins (not shown) for increasing the extent of cooling. The cooling relationship may also be enhanced through means which limit the heat transfer on the hot sides of the walls, for example, by means of flat surfaces covered with layers of thermally resistant materials.

The beryllium-copper shield or coating and the nozzle may be constructed of several shells so placed together so that the cooling channels are completed only when these shells are joined together. Thus, in each shell there may be formed a plurality of grooves of semicircular cross-section, each of which grooves will then be united with a corresponding groove on the other shell to form a channel (44' or 47') of circular cross-section. Before the joining of the shells, therefore, the grooves in each shell may, of course, be given any desired surface structure or cross-section.

The operation and power output of the engine may be regulated or varied in a number of ways, as, for example, by throttling of the fuel stream as it is fed to the preliminary combustion chamber and by throttling of the stream of liquid oxygen as it is fed to the centrifugal pump. The engine is additionally protected against overspeeding of the turbine by means of suitable speed governors (not shown) and against excessive temperatures in the combustion chambers and in the nozzle by means of temperature sensing elements (not shown) associated with suitable regulating or control devices. By means of differential pressure regulators (not shown) it may further be ensured that upon destruction of the engine or any vital part thereof the supply tanks of the fuel oil and the liquid oxygen are automatically cut off.

The arrangement for starting the engine may be so constructed that, upon actuation of a gas pedal or lever (not shown), the fuel mixture is directly and automatically bed to ignition burner 36 from the supply tanks, this feeding being automatically interrupted and stopped by means of suitable check valves (not shown) after ignition of the gases and starting of the engine.

Thus, it may be seen that there has been provided, in accordance with the broadest aspect of the invention, a jet engine comprising a hollow, elongated casing defining at least one combustion chamber therein, an exhaust nozzle connected to one end of said casing in communication with said chamber and having a discharge opening for combustion gases, a plurality of first cooling ducts disposed around said chamber and extending longitudinally thereof, a plurality of second cooling ducts adjacent said nozzle and extending substantially longitudinally of the latter, said first ducts communicating with said second ducts, respectively, at the junction of said casing and said nozzle, some of said first ducts communicating with said combustion chamber at the end of said casing remote from said junction, means located adjacent said discharge opening of said nozzle for establishing communication between predetermined second ducts, and compression means disposed adjacent said casing and communicating with the remaining first ducts at said end of said casing remote from said junction for feeding an oxygen-supplying liquid into said remaining first ducts under a pressure above the critical pressure of oxygen, whereby said liquid prior to its introduction into said combustion chamber is first forced through said first and second ducts in the direction of said discharge opening and then back through said second and first ducts for cooling both said casing and said nozzle.

Having thus described the invention, what is claimed as new and desired to be secured by Letters Patent is:

1. A jet engine comprising a hollow, elongated casing defining at least one combustion chamber therein, an outflow nozzle having a discharge opening for exhaust gases, said nozzle being connected to said casing at one end thereof and communicating with said chamber, first cooling ducts exteriorly of said chamber and extending longitudinally of said casing, second cooling ducts adjacent said nozzle and extending substantially longitudinally and exteriorly of said nozzle, said first ducts communicating with said second ducts, respectively, at the junction of said casing and said nozzle, some of said first ducts communicating with said combustion chamber at the end of said casing remote from said junction, means positioned adjacent said discharge opening of said nozzle for establishing communication between predetermined second ducts, and a centrifugal pump disposed adjacent said casing and communicating with the remaining first ducts at said end of said casing remote from said junction for feeding an oxygen-supplying liquid under a pressure above the critical pressure of oxygen into said remaining first ducts, whereby said liquid prior to its introduction into said combustion chamber is first forced through said first and said second ducts in the direction of said discharge opening and then back through said second and first ducts for cooling both said casing and said nozzle.

2. A jet engine according to claim 1, said cooling ducts being provided with roughened inner surfaces, whereby the cooling effect of said oxygen-supplying liquid is enhanced.

3. A jet engine according to claim 1, further including a beryllium-copper shield conforming to the interior shape of and disposed within said nozzle and covering the interior surface thereof to protect said surface from said exhaust gases.

4. A jet engine according to claim 1, further including a gas turbine wheel rotatably disposed within said casing and dividing the interior thereof into preliminary and final combustion chambers, said centrifugal pump comprising a rotor disposed adjacent said end of said casing remote from said junction and coaxially with said wheel, and shaft means rigidly connecting said rotor to said wheel, whereby as the latter is rotated due to flow of combustion gases from said preliminary combustion chamber to said final combustion chamber, said rotor is simultaneously actuated to feed said oxygen-supplying liquid into said remaining first ducts.

5. A jet engine according to claim 4, said turbine wheel being provided with radially extending bores opening into said final combustion chamber and with an axial bore communicating with said radial bores, said rotor being provided with an axial bore, and said shaft means comprising a hollow shaft providing a passageway between said axial bores, whereby fuel may be fed through said axial bores and said passageway into said radial bores to be centrifuged therefrom into said final combustion chamber as said wheel rotates.

6. A jet engine according to claim 5, further including conduit means having a first part communicating with said radial bores to receive a portion of said fuel centrifuged therethrough, said conduit means having a second part communicating with said preliminary combustion chamber, whereby said portion of said fuel may be fed into said preliminary combustion chamber at a speed corresponding to the rotational speed of said turbine wheel.

7. A jet engine comprising a hollow, elongated casing defining at least one combustion chamber therein, an exhaust nozzle connected to one end of said casing in communication with said chamber and having a discharge opening for combustion gases, a plurality of first cooling ducts disposed around said chamber and extending longitudinally thereof, a plurality of second cooling ducts adjacent said nozzle and extending substantially longitudinally of the latter, said first ducts communicating with said second ducts, respectively, at the junction of said casing and said nozzle, some of said first ducts communicating with said combustion chamber at the end of said casing remote from said junction, means located adjacent said discharge opening of said nozzle for establishing communication between predetermined second ducts, and compression means disposed adjacent said casing and communicating with the remaining first ducts at said end of said casing remote from said junction for feeding an oxygen-supplying liquid into said remaining first ducts under a pressure above the critical pressure of oxygen, whereby said liquid prior to its introduction into said combustion chamber is first forced through said first and second ducts in the direction of said discharge opening and then back through said second and first ducts for cooling both said casing and said nozzle.

8. A jet engine according to claim 7, further comprising flow responsive means disposed within said chamber in the path of flow of said combustion gases and drivingly connected to said compression means, whereby said compression means is actuated by said flow responsive means upon actuation of the latter by said flow of combustion gases to feed an excess amount of said oxygen-supplying liquid through said ducts and into said chamber.

9. A jet engine according to claim 8, said flow responsive means comprising a turbine wheel rotatably mounted within and axially of said casing and dividing said chamber into preliminary and final combustion chambers, said some of said first ducts communicating with said preliminary combustion chamber.

10. A jet engine according to claim 9, said turbine wheel being provided with radially extending bores opening into said final combustion chamber and with a further bore communicating with said radial bores, and means disposed in said preliminary chamber and defining a passageway establishing communication between said bores and a source of supply of fuel, whereby said fuel may be directed through said passageway and said bores to be centrifuged from said wheel into said final combustion chamber as said wheel rotates.

11. A jet engine according to claim 10, said turbine wheel further being provided with openings enabling excess oxygen to pass from said preliminary combustion chamber to said final combustion chamber.

12. A jet engine according to claim 11, said compression means comprising a centrifugal pump having a rotor disposed within said casing and coaxially with said turbine wheel, and shaft means rigidly interconnecting said turbine wheel and said rotor.

13. A jet engine comprising a casing having a first combustion chamber and a second combustion chamber therein, said casing having a discharge opening therein connected to said second combustion chamber, first cooling ducts exteriorly of said first and second combustion chambers, second cooling ducts adjacent and exteriorly of said discharge opening and communicating with said first ducts adjacent said discharge opening, some of said first ducts communicating with said first combustion chamber, means adjacent said discharge opening for establishing communication between predetermined second ducts, and a centrifuging pump disposed within said casing and communicating with the remaining first ducts adjacent said first chamber for feeding a cold oxygen supplying liquid into said remaining first ducts for cooling said casing and said discharge opening.

References Cited

UNITED STATES PATENTS 2,632,294 3/1953 Wall.
2,637,973 5/1953 Lawrence.
2,568,921 9/1951 Kroon _____ 60—39.74

SAMUEL FEINBERG, Primary Examiner

U.S. Cl. X.R.
60—39.66, 260